United States Patent

Friedland

[15] 3,661,708
[45] May 9, 1972

[54] FUEL SUBASSEMBLY FOR NUCLEAR REACTOR

[72] Inventor: Aaron J. Friedland, Oak Park, Mich.
[73] Assignee: Atomic Power Development Associates, Inc., Detroit, Mich.
[22] Filed: May 9, 1968
[21] Appl. No.: 727,827

[52] U.S. Cl. .................................. 176/28, 176/68, 176/78
[51] Int. Cl. ............................................. G21c 7/30, G21c 3/04
[58] Field of Search .................................. 176/27–29, 83, 176/91, 67, 76, 78, 68

[56] References Cited

UNITED STATES PATENTS

| | | | |
|---|---|---|---|
| 2,969,674 | 1/1961 | Ogle | 176/68 X |
| 3,068,161 | 12/1962 | Cawley | 176/28 |
| 3,201,322 | 8/1965 | Morrison | 176/28 X |
| 3,180,799 | 4/1965 | Blake | 176/28 X |
| 3,288,682 | 11/1966 | Pollak | 176/28 |
| 3,274,067 | 9/1966 | Greebler et al. | 176/76 X |
| 3,373,082 | 3/1968 | Dahlgren | 176/28 |
| 3,378,458 | 4/1968 | Ross et al. | 176/68 X |

Primary Examiner—Benjamin R. Padgett
Assistant Examiner—Harvey B. Behrend
Attorney—Ward, McElhannon, Brooks & Fitzpatrick

[57] ABSTRACT

A fuel subassembly for a nuclear reactor including a wrapper tube and an upper and lower core bundle assembly contained therein, one of the core bundle assemblies being connected to the wrapper tube in such a manner that when the temperature of the fuel subassembly increases said one core bundle assembly is axially displaced to a magnified extent with respect to the other core bundles assembly, and thus increases the negative feedback of the subassembly.

9 Claims, 8 Drawing Figures

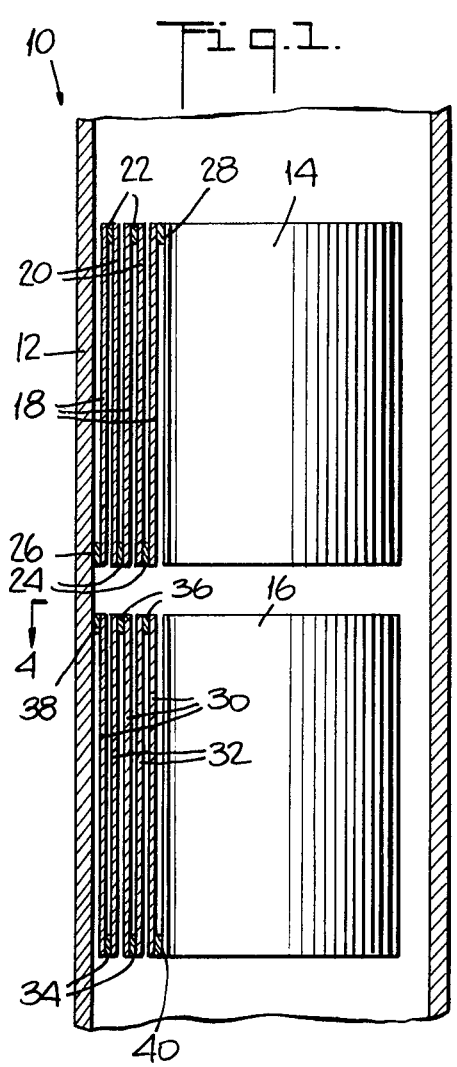
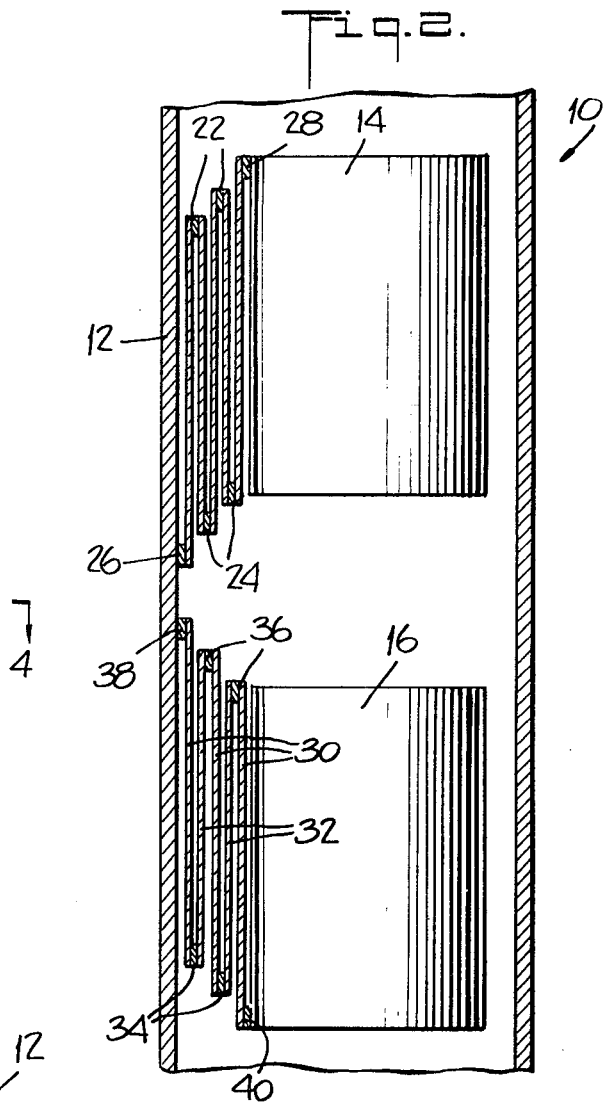
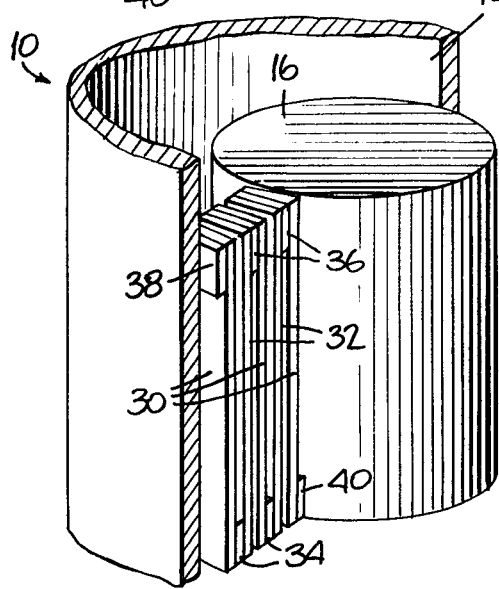
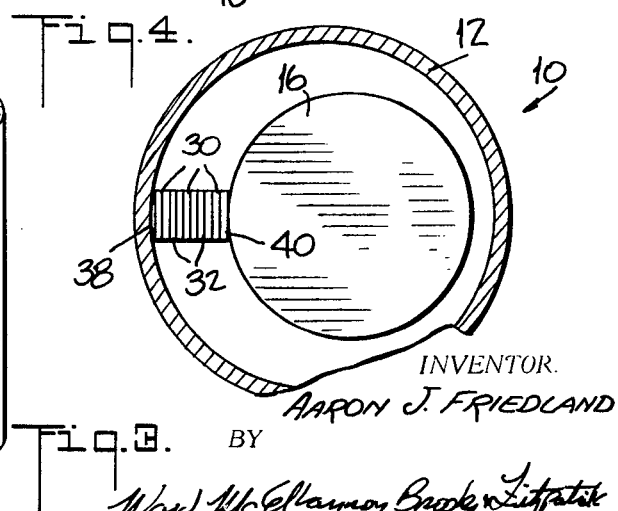

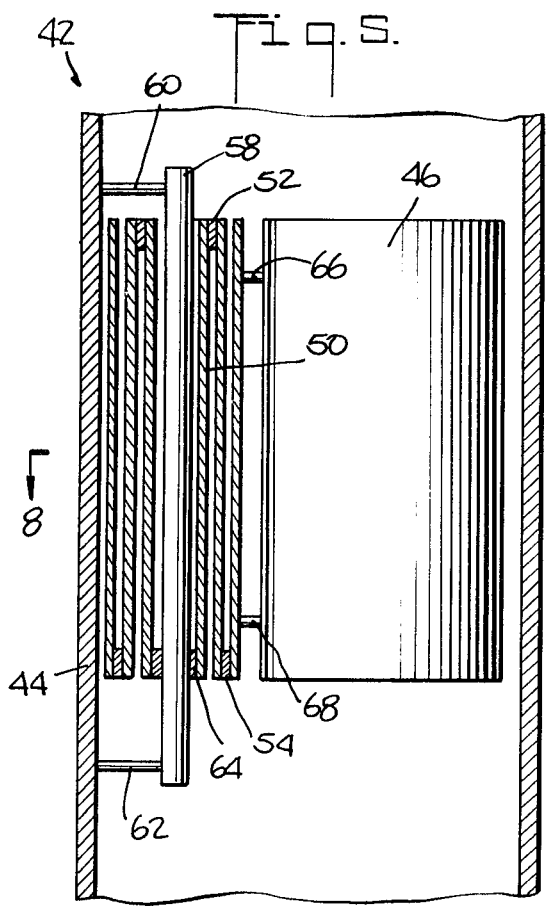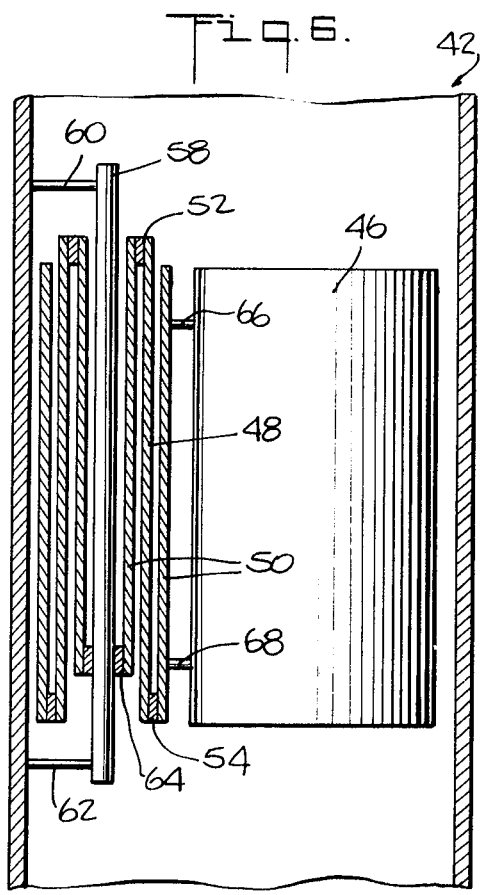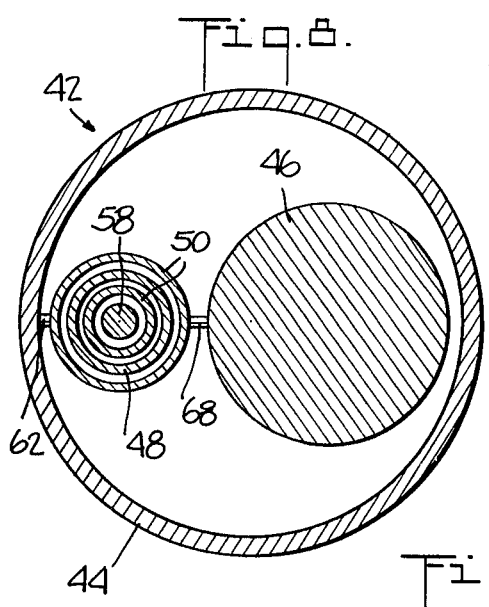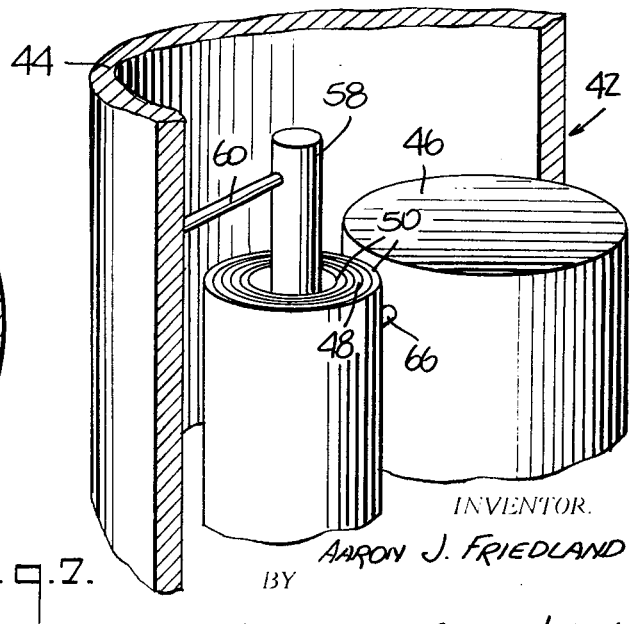
INVENTOR.
AARON J. FRIEDLAND

FUEL SUBASSEMBLY FOR NUCLEAR REACTOR

This invention has to do with nuclear reactors, and more particularly to new and improved fuel subassemblies therefor.

Normally, a nuclear reactor operates in a safe manner, but like all mechanical devices there is a possibility that some component might not operate properly. This can lead to overheating and substantial damage. A nuclear reactor may have a certain amount of resistance to excess temperature, which is usually referred to in the art as negative reactivity feedback. That is, the reactor may be provided with certain means by which the reactor will respond to increasing temperature in such a manner as to reduce the power level. However, frequently the reactivity negative feedback is not as large as desired, and hence it is an object of the present invention to provide for increasing the negative feedback and thereby greatly improve the safety factor of the reactor. The teachings of this invention are particularly useful for strengthening the total feedback in cases of accidental reactivity insertions for cores such as small oxide cores of fast reactors where additional feedback is desirable, and to provide a strong feedback component in cases of flow failure accidents for ceramic fueled cores, such as when the Doppler coefficient opposes shutdown and has to be overcome by stronger negative feedback effects, for example.

The present invention provides a nuclear reactor fuel subassembly which includes a wrapper tube and an upper and a lower core bundle assembly contained therein. Means are provided for interconnecting one of the core bundle assemblies and the wrapper tube which are expandable to a magnified extent responsive to an increase in the temperature of the fuel assembly. This serves to axially displace said one core bundle with respect to the other core bundle and thus increase the negative feedback of the subassembly.

In one form of the invention, the means for interconnecting the core bundle assembly and the wrapper tube include a plurality of elongated strips disposed in side by side relationship with alternate strips having high coefficients of thermal expansion and low coefficients of thermal expansion. The strips are alternately connected at their top ends and at their bottom ends, in series, and one end of the plurality of strips is attached to the wrapper tube and the other end thereof is attached to the core bundle assembly. When the temperature of the fuel subassembly increases, the core bundle assembly is axially displaced to a magnified extent.

In another form of the invention, the means for interconnecting the core bundle assembly and the wrapper tube include a plurality of concentric hollow cylinders with alternate cylinders having a high coefficient of thermal expansion and a low coefficient of thermal expansion. The cylinders are alternately connected at their top ends and at their bottom ends, in series. One end cylinder of the plurality of cylinders is attached to the wrapper tube and the other end cylinder is attached to the core bundle assembly.

There has thus been outlined rather broadly the more important features of the invention in order that the detailed description thereof that follows may be better understood, and in order that the present contribution to the art may be better appreciated. There are, of course, additional features of the invention that will be described hereinafter which will form the subject of the claims appended hereto. Those skilled in the art will appreciate that the conception on which this disclosure is based may readily be utilized as the basis for the design of other structures for carrying out the several purposes of the invention. It is important, therefore, that the claims be regarded as including such equivalent constructions as do not depart from the spirit and scope of the invention.

Several embodiments of the invention have been chosen for purposes of illustration and description, and are shown in the accompanying drawings, forming a part of the specification wherein:

FIG. 1 is a longitudinal sectional view of a fuel subassembly constructed in accordance with the teachings of my invention;

FIG. 2 is a longitudinal sectional view similar to FIG. 1, but showing the subassembly subsequent to the axial displacement of the core bundle assemblies due to an increase in temperature;

FIG. 3 is a perspective view of the subassembly of FIG. 1, partially broken away to show the relationship between the strips, the wrapper tube, and the core bundle assemblies;

FIG. 4 is a transverse sectional view taken along the line 4—4 of FIG. 1;

FIG. 5 is a longitudinal sectional view of another form of fuel subassembly constructed in accordance with the teachings of my invention;

FIG. 6 is a longitudinal sectional view similar to FIG. 5, but showing the subassembly subsequent to the axial displacement of the core bundle assembly due to an increase in temperature thereof;

FIG. 7 is a perspective view of the subassembly of FIG. 5, partially broken away, to show the relationship between the hollow cylinders, the wrapper tube, and the core bundle assembly; and FIG. 8 is a transverse sectional view taken along the line 8—8 of FIG. 5.

In the embodiment of the invention illustrated in FIGS. 1-4, the fuel subassembly, indicated generally at 10, includes a wrapper tube 12, an upper core bundle assembly 14 and a lower core bundle assembly 16. Means are provided for interconnecting each of the core bundle assemblies to the wrapper tube, these means expand to a magnified extent responsive to an increase in the temperature of the fuel subassembly, and they include a plurality of substantially parallelly disposed longitudinally extending metal strips 18 having a high coefficient of thermal expansion, and a like plurality of substantially parallelly disposed longitudinally expanding strips 20 having a low coefficient of thermal expansion. The strips 18 having high coefficients thermal expansion are disposed in alternate relationship with respect to the strips 20 having low coefficients of thermal expansion. The low coefficient strips 20 serve to connect the top of one high coefficient strip 18, as at 22, to the bottom of the next high coefficient strip, as at 24. One end of the plurality of strips is connected to the wrapper tube as at 26, and the other end thereof is connected to the upper core bundle assembly 14, as at 28. When the temperature of the fuel subassembly increases, the strips 20 having high coefficients of thermal expansion will expand, thereby causing the upper core bundle assembly to be axially displaced in an upward direction from its position as seen in FIG. 1 to its position as seen in FIG. 2. In a similar manner, the lower core bundle assembly is connected to the wrapper tube. Strips 30 having high coefficients of thermal expansion are alternately disposed with respect to strips 32 having low coefficients of thermal expansion. The low coefficient strips 32 serve to connect the bottom of one high coefficient strip 30, as at 34, to the top of the next high coefficient strip, as at 36. One end of the plurality of strips is connected to the wrapper tube as at 38, and the other end thereof is connected to the lower core bundle 16, as at 40. When the temperature of the fuel subassembly increases, the strips 30 having high coefficients of thermal expansion expand, thereby causing the lower core bundle assembly to be axially displaced in a downward direction from its position as seen in FIG. 1 to its position as seen in FIG. 2, and thus increasing the negative feedback of the subassembly.

In the embodiment of the invention illustrated in FIGS. 5-8, the fuel subassembly, indicated generally at 42, includes a wrapper tube 44, and a core bundle assembly 46. Means are provided for interconnecting the wrapper tube and the core bundle which expand, to a magnified extent, in response to an increase in the operating temperature of the fuel subassembly. These means comprise a plurality of concentric hollow cylinders 48 having high coefficients of thermal expansion, and a like plurality of concentric hollow cylinders 50 having low coefficients of thermal expansion, the strips of high and low coefficients of thermal expansion being disposed in alternate relationship. The cylinders are alternately connected at their top ends, as at 52, and at their bottom ends, as at 54, in series. One end cylinder of the plurality of cylinders, which may be the innermost cylinder, is attached to the wrapper tube as by means of a vertically disposed connecting bar 58 and tie rods 60 and 62, the innermost cylinder being attached to the connecting bar, as at 64. The other end cylinder, which may be the outermost cylinder, is connected to the core bundle 46, as by means of connecting arms 66 and 68, provided for the purpose. When the temperature of the fuel subassembly increases, the cylinders having the high coefficients of thermal expansion will expand, thereby causing the core bundle assembly to be axially displaced in a downward direction from its position as seen in FIG. 5 to its position as seen in FIG. 6, and thus increasing the negative feedback effects. It will be appreciated that it is within the concept of my invention to employ the embodiment of FIGS. 5-8 with a split core bundle assembly as was explained more fully hereinbefore in connection with the embodiment of FIGS. 1-4. That is, the core bundle assembly 46 would be the lower core bundle assembly which is axially displaced downwardly, and a second identical core bundle assembly mounted thereabove would be the upper core bundle assembly and it would be displaced in an upward direction, when the temperature of the fuel subassembly increased.

It will thus be seen that the present invention does indeed provide an improved fuel subassembly for nuclear reactors which is superior in simplicity, economy and efficiency as compared to prior art such devices.

Although certain particular embodiments of the invention are herein disclosed for purposes of explanation, various modifications thereof, after study of the specification, will be apparent to those skilled in the art to which the invention pertains, and reference should accordingly be had to the appended claims in determining the scope of the invention.

What is claimed and desired to be secured by letters patent is:

1. In a nuclear reactor, the combination comprising a fuel subassembly including a wrapper tube, and an upper and a lower core bundle assembly contained therein, means interconnecting one of said core bundle assemblies and said wrapper tube, said means including a plurality of high coefficient of thermal expansion members and a like plurality of low coefficient of thermal expansion members disposed in alternate relationship, the members being alternately connected at their top ends and at their bottom ends in series responsive to an increase in temperature of the fuel subassembly, one end of said series being connected to said wrapper tube and the other end of said series being connected to said one core bundle assembly to axially displace said one core bundle assembly with respect to the other core bundle assembly within said wrapper tube, thereby to effectively increase the negative feedback of said subassembly.

2. In a nuclear reactor according to claim 1 wherein said plurality of high coefficient of thermal expansion members and said plurality of low coefficient of thermal expansion members are strips disposed in a side by side relationship with alternate strips having high coefficients of thermal expansion and low coefficients of thermal expansion.

3. In a nuclear reactor according to claim 2 wherein said strips are interposed between said wrapper tube and said core bundle assembly, and wherein said strips are substantially parallel with the longitudinal axis of said wrapper tube.

4. In a nuclear reactor according to claim 2 wherein said strips are elongated and wherein said strips are thin and narrow.

5. In a nuclear reactor, the combination comprising a fuel subassembly including a wrapper tube, an upper core bundle assembly and a lower core bundle assembly contained within said wrapper tube, a first plurality of elongated metal strips, alternate strips having a high coefficient of thermal expansion and a low coefficient of thermal expansion, the strips being alternately connected at their top ends and a their bottom ends in series, one end of said plurality of strips being attached to said wrapper tube and the other end thereof being attached to said core bundle assembly to cause magnified axial displacement of said upper core bundle assembly in an upward direction; a second plurality of elongated metal strips, alternate strips of said second plurality of strips having a high coefficient of thermal expansion and a low coefficient of thermal expansion, said second plurality of strips being alternately connected at their top ends and at their bottom ends in series, one end of said second plurality of strips being attached to said wrapper tube and the other end thereof being attached to said lower bundle to cause axial displacement of said lower bundle assembly in a downward direction, thereby to reduce reactivity of said nuclear reactor when the temperature of said fuel subassembly increases.

6. In an nuclear reactor to claim 1 wherein said plurality of high coefficient of thermal expansion members and said plurality of low coefficient of thermal expansion members are a plurality of concentric hollow cylinders having a high coefficient of thermal expansion and a plurality of concentric hollow cylinders having a low coefficient of thermal expansion.

7. In a nuclear reactor according to claim 3 wherein said cylinders are elongated and are disposed between said core bundle assembly and the wrapper tube.

8. In a nuclear reactor according to claim 3 further comprising a connecting bar disposed in parallel relationship with respect to said cylinders and being positioned within the innermost cylinder, said innermost cylinder being attached to said connecting bar, at least one tie rod fixedly connecting said connecting bar to the wrapper tube, and at least one connecting arm fixedly connecting the outermost cylinder to the core bundle assembly.

9. In a nuclear reactor according to claim 8 wherein said connecting bar is longer in length than the length of said cylinders, and wherein one tie rod is disposed adjacent one end of the connecting bar and another tie rod is disposed adjacent the other end of the connecting bar.

* * * * *